United States Patent [19]

Gridnev et al.

[11] Patent Number: 5,587,431
[45] Date of Patent: Dec. 24, 1996

[54] SYNTHESIS OF TERMINALLY UNSATURATED OLIGOMERS

[75] Inventors: Alexei A. Gridnev, Greenville; Steven D. Ittel, Wilmington, both of Del.

[73] Assignee: E. I. Du Pont de Nemours and Company, Wilmington, Del.

[21] Appl. No.: 426,517

[22] Filed: Apr. 21, 1995

[51] Int. Cl.⁶ .......................................... C08F 4/80
[52] U.S. Cl. ................ 525/269; 525/54; 525/910; 525/299; 526/172; 526/67; 526/68; 526/329.7; 526/328; 526/341; 526/347.1
[58] Field of Search .................... 526/67, 68, 69, 526/70, 172; 525/54, 269, 910

[56] References Cited

U.S. PATENT DOCUMENTS

| | | | |
|---|---|---|---|
| 3,821,330 | 6/1974 | Free | 526/68 |
| 4,680,352 | 6/1987 | Janowicz et al. | 526/147 |
| 4,680,354 | 7/1987 | Lin et al. | 526/172 |
| 4,694,054 | 9/1987 | Janowicz | 526/93 |
| 4,722,984 | 2/1988 | Janowicz | 526/123 |
| 5,324,879 | 6/1994 | Hawthorne | 585/511 |
| 5,362,826 | 11/1994 | Berge et al. | 526/194 |

OTHER PUBLICATIONS

Abbey, K. J. et al, *J. Polymer Science: Part A: Polymer Chemistry*, 31, 3417–3424 (1993).

*Primary Examiner*—Mark Nagumo

[57] ABSTRACT

This invention relates to a method for preparing compositions comprising terminally unsaturated polymers of low molecular weight, referred to as oligomers or macromonomers. In particular, a first oligomer composition is obtained by free radical polymerization of a reaction mixture comprising monomers. Terminally unsaturated oligomers in the first oligomer composition, or a selected portion of the composition, are reinitiated into free radicals in order to continue their oligomerization to a desired endpoint. The process is useful for preparing an oligomer composition having a controlled degree of polymerization. The process is also useful for preparing block copolymers. Such oligomer compositions or block polymers are useful for preparing engineered or structured polymers used in making various end products, including plastics, coatings, films, and dispersants.

15 Claims, No Drawings

SYNTHESIS OF TERMINALLY UNSATURATED OLIGOMERS

FIELD OF THE INVENTION

This invention relates to a method of preparing compositions of terminally unsaturated polymers of low molecular weight, referred to as oligomers or macromonomers. The process is useful for preparing a mixture of terminally unsaturated oligomers having a desired degree of polymerization and for preparing block copolymers.

TECHNICAL BACKGROUND

Oligomers containing an olefinic end group are known in the art. For example, U.S. Pat. No. 5,362,826 discloses a process of obtaining terminally unsaturated oligomers (ω-ethylenically unsaturated oligomers). Such oligomers are known to be useful as non-metallic chain transfer agents.

Terminally unsaturated oligomers can be made by a number of conventional means. One way is to employ metal-containing chain transfer catalysts, for example, consisting of cobalt (II or III) chelates such as disclosed in U.S. Pat. No. 4,680,352, U.S. Pat. No. 4,694,054, U.S. Pat. No. 5,324,879, or WO 87/03605 published Jun. 18, 1987.

Conventional wisdom had been that, once formed, terminally unsaturated oligomers, including dimers and higher molecular weight species, are essentially inert to the oligomerization process. This belief is based upon the observation that the oligomers cannot be homopolymerized or copolymerized with methacrylic monomers to a reasonable extent. For example, K. J. Abbey et al., in *J. Polymer Science: Part A: Polymer Chemistry*, 31, p. 3417–3424 (1993) believe this is due to the instability of intermediates formed after addition of propogating radicals to the oligomers. The radicals are so sterically hindered that they cannot react with another oligomer or monomer and decompose (in a so-called β-scission reaction) to yield initial oligomer or the like. This has now been confirmed in blank experiments (see Comparative Examples 3 and 5 below), which show that, without an effective amount of chain transfer catalyst, incorporation into polymer occurs to only a negligible extent.

Surprisingly, it has now been found that a metal-containing chain transfer catalyst can be used to reinitiate the terminated chains of a terminally unsaturated oligomer for further oligomerization. This has led to an improved polymerization process for making terminally unsaturated oligomers having a controlled degree of polymerization (DP) in the polymerization process without a significant yield loss or disposal problem.

SUMMARY OF THE INVENTION

This invention provides a method for preparing an oligomer composition by free radical polymerization. In particular, the invention relates to the free radical polymerization of a reaction mixture comprising monomers to produce a first or primary oligomer composition, and subjecting oligomers in the primary oligomer composition, or a portion thereof, to reinitiation as free radicals in order to continue their polymerization (oligomerization) to a desired endpoint. In particular, the present process is useful for preparing a mixture of oligomers or macromonomers having a desired average DP (degree of polymerization) or for preparing an oligomer composition or mixture with reduced amounts of oligomer species having a DP or molecular weight below a certain number.

When using the present invention to prepare an oligomer composition having a desired average molecular weight or degree of polymerization, a lower molecular weight fraction of a first oligomer composition is separated out and oligomers contained therein are reinitiated as free radicals for further oligomerization, in order to increase the average degree of polymerization (DP) of the lower molecular weight fraction.

In one embodiment of the present process, a first oligomer mixture, having a preselected degree of polymerization (DP) equal to n, is produced in a reaction zone by oligomerization in the presence of a metallic chain transfer catalyst. A fraction of this first oligomer mixture, including any unreacted monomer, is separated out, wherein essentially all of the oligomers in said fraction have a DP less than or equal to m, which is less than n. (For example, n may be equal to 4 or more and m may be 2 or 3.) The separated fraction is then be recycled back to the oligomerization step where oligomers contained in the separated fraction are reinitiated as free radicals for further oligomerization in the presence, once again, of a metallic chain transfer catalyst. A metallic chain transfer catalyst may be added continuously or discretely to the reaction zone. In a continuous process, a portion of the first oligomer composition is continuously fractionated, a relatively higher DP or molecular weight fraction may be continuously withdrawn as a product stream, while a relatively lower DP or molecular weight fraction is recycled to the oligomerization reactor. New monomer and cobalt could be continuously or semi-continuously introduced into the oligomerization reactor. Accordingly, a continuous process could achieve a steady state concentration of dimer in the oligomerization reactor.

Alternatively, oligomers in the separated fraction can be separately reinitiated by further exposure to a metallic chain transfer catalyst and then separately used, combined with a second stream, or, after separate reinitiation, recycled to the first oligomer mixture in the oligomerization reactor.

When the present invention is used for making a block copolymer, oligomers contained in a first oligomer mixture are reinitiated as free radicals in the presence of a second monomer. This reinitiation with different monomers may be reiterated r times to make r+1 sequential blocks in a copolymer.

The afore-mentioned first oligomer mixture or composition preferably has a degree of polymerization (DP) ranging from about 2 to about 12. In the case of a batch process, the DP of the product may increase beyond the DP of the first oligomer composition. In the case of a continuous (CSTR) process in which a lower molecular weight fraction is continuously removed, with continuous recycle, the average DP of the oligomer mixture in the reaction zone may be at steady state with a preselected DP of 3 or more. Similarly, block copolymers made by the present process may have an average DP of 3 or more.

DETAILS OF THE INVENTION

The present process involves the initiation and reinitiation of oligomeric free radicals to make methacrylate-containing terminally unsaturated oligomers, sometimes referred to as macromonomers. The term "macromonomer" is also sometimes used to describe polymers of limited chain length or molecular weight which have such terminal olefinic moieties.

The term molecular weight ($M_w$), unless indicated otherwise, is used herein to mean weight average molecular weight. The term "degree of polymerization" or DP is used herein to mean an average DP in the case of a mixture of oligomers having a plurality of DPs.

Conventionally, when making terminally unsaturated oligomers by a free radical polymerization process under conventional processing conditions and in the presence of a metal chain transfer agent, a molecular weight distribution of terminally unsaturated oligomers are produced, which includes "low end" oligomers having DPs of 2 and 3 (i.e., dimers and trimers). For some uses, such "low end" oligomers are less desirable than higher DP oligomers (i.e., tetramer and above). Previously, such "low end" oligomers might have been separated out and disposed of in a waste stream.

Terminally unsaturated oligomers made by the present invention may be useful for incorporation into larger polymers, including structured or engineered polymers. Such oligomers may also be useful as non-metallic chain transfer agents, to control the molecular weight of other polymerization processes for making methacrylate-containing polymers or copolymers. For this latter purpose, trimers or tetramers and higher DP oligomers are generally preferable to dimers, because dimers are less effective chain transfer agents. On the other hand, trimers or tetramers and higher DP oligomers below a certain DP may be preferable to oligomers above a certain DP, because oligomers having a relatively higher DP may be relatively more expensive. Although requiring greater amounts of starting monomer, oligomers having a relatively higher DP may not be any more effective per mole than oligomers with a relatively lower DP.

The present process allows greater control over the distribution of DP of the oligomers in the product composition made by catalytic chain transfer. The most desirable DP, or distribution of DP, may vary from application to application. For use as a non-metallic chain transfer agent, however, the least valuable oligomers, for reasons of properties or effectiveness, are dimer and trimer. Dimers and trimers, as already mentioned, may be less active as chain transfer agents. They may also be undesirable for reasons of volatility and odor.

The present process may be a batch or continuous process. In a continuous process, "low end" oligomers can be separated out from the reaction mixture in a polymerization reactor and recycled back to the reaction mixture, thereby subjecting said "low end" oligomers to a metallic chain transfer catalyst for a second time.

Alternatively or additionally, chain transfer agent can be added to the separated "low end" oligomers to convert them to higher order oligomers. For use as a non-metallic chain transfer agent, the oligomers prepared according to the present invention suitably have a final (average) degree of polymerization of about 3 to 20, more preferably about 4 to 12, even more preferably about 4 to 8, and most preferably about 6. For other uses, however, the desired ranges can vary, as indicated above.

A typical continuous method of operation, according to the present invention, would involve polymerizing, in a reaction zone, monomer in the presence of an effective amount of metallic chain transfer catalyst such as cobalt (II or III) chelates, thereby producing a primary oligomer composition comprising terminally unsaturated oligomers having an average degree of polymerization ranging from about 2 to about 12. At least a portion of the primary oligomer composition would be removed from the reaction zone and fractionated in a separation zone into a relatively lower DP oligomer fraction and a relatively higher DP fraction. At least dimer, typically with some unreacted monomer, would be fractionated into the relatively lower DP oligomer fraction. Depending on the desired product, a mixture of monomer, dimer, and trimer may be fractionated into the relatively lower DP oligomer fraction. This relatively lower DP fraction could be recycled back to said reaction zone, where the terminally unsaturated oligomers in said relatively lower DP fraction would again be subjected to an effective amount of said metallic chain transfer catalyst in order to reconvert said terminally unsaturated oligomers in said relatively lower DP fraction to free radicals for further polymerization. A small portion of the the recycled fraction may be removed as purge. The relatively higher DP fraction, from the separation zone, may be withdrawn as a product composition comprising terminally unsaturated oligomers having, for example, a degree of polymerizaton of 3 to 12.

According to one embodiment of the present invention, oligomer recycle and reinitiation according to the present invention can be used to form a monomodal distribution of oligomer, for example, centered at "decamer," with little or no remaining monomer, dimer, or trimer left in the final product. A composition consisting of tetramer and above is preferred. As mentioned above, on a molar basis, the dimers and trimers are less efficient stoichiometric chain transfer agents in methacrylate polymerizations.

Dimer or dimers and other "low end" oligomers can be separated from a mixture of oligomers by distillation or other separation techniques, such as liquid chromatography, selective extraction, or membrane separation. Monomer and dimer could be recycled to the oligomerization step or reactor, where they would again be subjected to a metallic chain transfer catalyst. The remainder of the mixture could be withdrawn as product. Such a process could result in dimers or dimers and other "low end" oligomers being used up in the synthesis rather than being sent to a waste stream.

As indicated above, block copolymers can also be made according to the present invention. The purity of the block copolymers is determined by the competitive reaction of oligomer and monomer for the cobalt catalyst. For that reason, a process which is "starve-feed" with respect to monomer, and high concentration with respect to oligomer, will provide the highest proportion of block copolymers. For example, when methyl methacrylate (MMA) dimer is reacted with "n" moles of butyl methacrylate monomer (BMA), in the presence of a cobalt chain transfer agent, a block copolymer is predominantly formed (MMA-MMA-BMA$_n$). Without the cobalt chain transfer agent, but with an initiator such as AIBN, the product was poly(BMA), with only negligible incorporation of MMA dimer. BMA may be chain terminated by the MMA, but the MMA dimer will never initiate a chain.

As written herein, the formulas of unsaturated oligomers or macromonomers are meant to convey structural information. For example, the formula MMA$_2$BMA explicitly implies the structure:

H—CH$_2$—CMe(CO$_2$Me)—CH$_2$—CMe(CO$_2$Me)—CH$_2$—C(CO$_2$Bu)=CH$_2$.

Regarding this structure, the propagation of the radical chain is from left to right structure. Thus, the oligomers are initiated with a hydrogen atom, giving a saturated end on the left of the structure. The oligomer is then terminated by hydrogen atom abstraction by the catalyst, giving an olefinic group at the right end of the oligomer.

In the present invention, the oligomers mentioned herein, including those contained in the reaction mixture or the product composition, suitably comprise, by weight, 80 to 100% of methacrylates of the formula $CH_2=C(CH_3)CO_2J$ wherein J is H, $C_1-C_{12}$ alkyl, $C_2-C_{12}$ alkenyl, glycidyl, $C_2-C_{12}$ hydroxyalkyl, allyloxyethyl, 2,4-hexadienyl, $C_xH_{(2x+1-y)}F_y$ where x is 1 to 16 and y is 0 to 2x+1, $R_6R_7N(CH_2)_z$ where $R_6$ and $R_7$ are independently $C_1$ to $C_{12}$ alkyl and z is 1 to 10, or $R_8R_9R_{10}Si(CH_2)_z$ where $R_8$, $R_9$ and $R_{10}$ are independently $C_1$ to $C_{12}$ alkyl or $C_1$ to $C_{12}$ alkoxy and z is 1 to 10. In addition the monomers may comprise methacrylonitrile, α-methyl styrene, methacrylamide derivatives of the formula $CH_2=C(CH_3)CON(R)_2$ wherein each R is independently H, $C_1$ to $C_{10}$ alkyl or $(CH_2)_nZ$, n is an integer from 1 to 10, Z is COOY, OH, $N(R_1)_2$, $SO_3Y$ and Y is H, Li, Na, K, or $N(R)_4$; vinyl esters and acetates of the formula $CH_2=CHOOCR$, wherein R is $C_1$ to $C_{12}$ alkyl; and any and all monomer mixtures thereof.

The monomers forming the macromonomer may also comprise minor amounts (less than about 20% by weight) of styrene, maleic anhydride, fumarate derivatives such as fumaronitrile, dialkylfumarate and fumaric acid.

In another embodiment, the monomers may further comprise minor amounts (less than about 20% by weight) of the following monomers: vinyl halides of the formula $CH_2=CHX$ wherein X is Cl or F, vinylidene halides of the formula $CH_2=C(X)_2$ wherein each X is independently Cl or F, substituted butadienes of the formula $CH_2=C(R)C(R)=CH_2$ wherein each R is independently H, $C_1$ to $C_{10}$ alkyl, Cl or F, ethylenesulfonic acid derivatives of the formula $CH_2=CHSO_3X$ wherein X is Na, K, Li, $N(R)_4$, H, R or $(CH_2)_nZ$ where n is an integer from 1 to 10, Z is COOY, OH, $N(R)_2$, or $SO_3Y$, Y is H, Li, Na, K or N(R) and R is independently $C_1$ to $C_{10}$ alkyl, acrylamide derivatives of the formula $CH_2=CHCON(R)_2$ wherein each R is independently H, $C_1$ to $C_{10}$ alkyl, or $(CH_2)_nZ$, n is an integer from 1 to 10, Z is COOY, OH, $N(R_1)_2$ or $SO_3Y$ and Y is H, Li, Na, K or $N(R_1)_4$ where R is Cl to $C_{10}$ alkyl.

The methacrylates described above would thus include branched alkyl or n-alkyl esters of $C_1-C_{12}$, alcohols (for example, methyl and ethyl methacrylate), methacrylic acid, and allyl, glycidyl, hydroxyalkyl (for example, hydroxyethyl and hydroxypropyl), allyloxyethyl, 2,4-hexadienyl (sorbyl), dialkylaminoalkyl, fluoroalkyl, and trialkylsilylalkylene methacrylates.

Of the contemplated monomers or comonomers, methacrylates are preferred for reasons of commercial applicability, cost, and/or ease of synthesis.

The oligomers produced according to the present process therefore include those oligomers having the following end group:

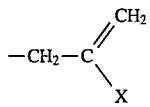

where X is $-CONR_2$, $-COOR$, $OR^1$, $-OCOR$, $-OCOOR^1$, $-NRCOOR^1$, halo, cyano, or a substituted or unsubstituted phenyl or aryl, wherein each R is independently selected from the group of hydrogen, silyl, or a substituted or unsubstituted alkyl, alkyl ether, phenyl, benzyl, or aryl, wherein said groups may be substituted with epoxy, hydroxy, isocyanato, cyano, amino, silyl, acid (—COOH), halo, or acyl; and wherein $R^1$ is the same as R except not H; wherein each alkyl is independently selected from the group consisting of branched, unbranched, hydrocarbons having 1 to 12, preferably 1–6, and most preferably 1–4 carbon atoms or cyclical hydrocarbons having 4–12, preferably 4–6 carbon atoms; halo or halogen refers to bromo, iodo, chloro and fluoro, preferably chloro and fluoro, and silyl includes $-SiR^2(R^3)(R^4)$ and the like, wherein $R^2$, $R^3$, and $R^4$ are independently alkyl, phenyl, alkyl ether, or phenyl ether, preferably at least two of $R^2$, $R^3$, and $R^4$ being a hydrolyzable group, more preferably two of which are alkyl ether, wherein alkyl is as defined above, preferably methyl or ethyl. A plurality of silyl groups may be condensed, for example, an organopolysiloxane such as $-Si(R^2)_2-O-Si(R^3)_2R^4$, wherein $R^2$, $R^3$, and $R^4$ are independently alkyl. See U.S. Pat. No. 4,518,726, hereby incorporated by reference, for further exemplification of silyl groups in general.

A preferred class of oligomers made according to the present process are those oligomers according to the above structure in which X is $-CONR_2$, $-COOR$, unsubstituted or substituted phenyl, aryl, halo, or cyano, and R is as defined above.

A more preferred class of oligomers made according to the present process are those oligomers according to above structure in which X is $-COOR$, cyano, or phenyl and R is hydrogen, alkyl or phenyl unsubstituted or substituted with epoxy, hydroxy, or alkoxysilyl.

Preferably, the oligomers prepared according to the present process are characterized by the following end group:

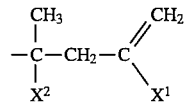

wherein $X^1$ and $X^2$ are independently (the same or different) X as defined above.

The general chemical structure of oligomers prepared in the present process have the following structure:

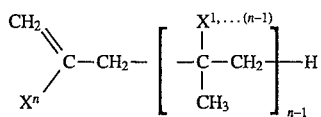

wherein $X^1$ to $X^n$ is independently defined as above for X and n is on average 2 to 100, preferably 4 to 12.

For example, a general formula for a methacrylate oligomeric chain transfer agent is as follows:

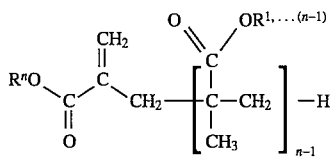

wherein $R^1$ to $R^n$ are independently (the same or different) and defined as above for R and n is on average 2 to 20, preferably 4 to 8.

As a further very specific example, a methyl methacrylate trimer, wherein n equals 3 and R equals $-CH_3$, is as follows.

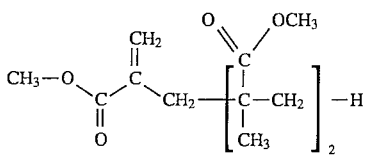

The concentration of terminally unsaturated oligomer in a composition prepared according to the present invention is at least about 80 mol %, preferably at least about 85 mol %, more preferably at least about 90 mol %, up to about mol %.

The present invention for producing macromonomers involves free radical polymerization of unsaturated monomers, some of which may carry functional groups for later crosslinking. This polymerization may occur in suspension, emulsion or solution, in aqueous or organic media, as will be familiar to those skilled in the art.

The oligomers are typically prepared in a polymerization reaction by standard solution polymerization techniques, but may also be prepared by emulsion, suspension or bulk polymerization processes. A metal-containing chelate chain transfer catalyst is employed in the method of preparation. Preferred metallic chain transfer catalysts for use in making the present oligomers are cobalt (II) and (III) chelates. Examples of such cobalt compounds are disclosed in U.S. Pat. No. 4,680,352, U.S. Pat. No. 4,694,054, U.S. Pat. No. 5,324,879 WO 87/03605 published Jun. 18, 1987, U.S. Pat. No. 5,362,826, and U.S. Pat. No. 5,264,530, all hereby incorporated by reference in their entirety. Other useful cobalt compounds (cobalt complexes of porphyrins, phthalocyanines, tetraazoporphyrins, and cobaloximes) are respectively disclosed in Enikolopov, N. S. et at., USSR Patent 664,434 (1978); Golikov, I. et at., USSR Patent 856,096 (1979), Belgovskii, I. M., USSR Patent 871,378 (1979), and Belgovskii, I. M. et al., USSR Patent 1,306,085 (1986), all hereby incorporated by reference in their entirety.

These catalysts operate at close to diffusion-controlled rates and are effective at part-per-million concentrations. There is an inverse relationship between the level of cobalt catalyst and the molecular weights obtained, as described by Janowicz et al. in U.S. Pat. 4,680,352. The plot of $1/(M_w)$ or 1/DP versus the concentration of the catalyst is linear, wherein $M_w$ is the molecular weight and DP is the degree of polymerization. With respect to the present invention, the concentrations of the cobalt (Co) catalyst are somewhat higher than those normally employed in catalytic chain transfer reactions, as exemplified in U.S. Pat. No. 4,680,352. The preferred concentration will range from $10^{-4}$ to $10^{-2}$ molar cobalt.

When employing a cobalt chelate in the preparation of the present oligomers, it may be feasible to remove cobalt as well as any color from the reaction product by precipitation with a solvent and the subsequent use of activated charcoal. For example, the addition of ethyl acetate (Rhone-Poulenc AR grade, 99.5%, 0.005% acetic acid) in various proportions has been found to cause substantial precipitation of cobalt as a dark brown solid and therefore decreased color in the final solution. Other precipitating solvents include a mixture of acetone and water and a mixture of acetonitrile and water. Color may be further removed by classical techniques, for example, simple treatment with activated charcoal for about 15 minutes followed by filtration though a short column packed with Celite® 545 filter aid.

An initiator such as an azo compound, which produces carbon-centered radicals, sufficiently mild not to destroy the metal chelate chain transfer agent, is typically also employed in preparing the oligomers. Suitable initiators are azo compounds having the requisite solubility and appropriate half life, including azocumene; 2,2'-azobis(2-methyl)butanenitrite; 4,4'-azobis(4-cyanovaleric acid); and 2-(t-butylazo)-2-cyanopropane.

The polymerization or oligomerization process, employing the above described metallic chain transfer catalysts, is suitably carried out at a temperature ranging from bout room temperature to about 200° C. or higher, perferably about 40° C. to 100° C. The polymerization process can be carried out as either a batch, seimi-batch, continuous or feed process. When carried out in the batch mode, the reactor is typically charged with metal chain transfer catalyst and monomer, or monomer and medium (or solvent). To the mixture is then added the desired amount of initiator, typically such that the M/I (monomer to initiator) reaction is 5 to 1000. The mixture is then heated for the requisite time, usually about 30 minutes to about 12 hours. In a batch process, the reaction may be run under pressure to avoid monomer reflux. After the reaction is complete, a low DP fraction can be separated out and subjected to further metallic chain transfer catalyst in order to increase its DP.

If the polymerization is to be carried out as a feed system, the reaction may typically be carried out by heating and stirring at least the medium, typically an organic solvent, in a reaction vessel, while any of the other components, or combination of components, such as monomer, chain transfer catalyst, and initiator are introduced, for example, by a syringe pump or other pumping device, until the reaction is completed and the first oligomer composition prepared.

As indicated above, the polymerization can be carried out in the absence of, or in the presence of, any medium or solvent suitable for free-radical polymerization, including, but not limited to, ketones such as acetone, butanone, pentanone and hexanone, alcohols such as isopropanol, amides such as dimethyl formamide, aromatic hydrocarbons such as toluene and xylene, ethers such as tetrahydrofuran, diethyl ether and ethylene glycol, dialkyl ethers such as Cellosolves® solvent, alkyl esters or mixed ester ethers such as monoalkyl ethermonoalkanoates, and mixtures or two or more solvents.

Terminally unsaturated oligomers or block copolymers prepared according to the present invention can be employed, not only as non-metallic chain transfer agents, but as useful components or intermediates in the production graft polymers, non-aqueous dispersed polymers, microgels, star polymers, branched polymers, and ladder polymers. For example, using standard polymerization techniques, graft polymers can be synthesized by reacting one or more oligomers made according to the present invention with one or more monomers having polymerizing compatibility with the oligomers and with each other.

Oligomers made by the present process, sometimes referred to as macromonomers, are useful in a wide variety of coating and molding resins. Other potential uses can include cast, blown, spun or sprayed applications in fiber, film, sheet, composite materials, multilayer coatings, photopolymerizable materials, photoresists, surface active agents, dispersants, adhesives, adhesion promoters, and coupling agents, among others. End products taking advantage of available characteristics can include, for example, automotive and architectural coatings or finishes, including high solids, aqueous, or solvent based finishes.

In the following examples, HPLC analysis was performed with a Hewlett-Packard® liquid chromatograph model 1090, microstyrogel columns, with THF used as solvent at 35° C. at a flow rate of 1 ml/min.

$K^+IDS$ mass spectroscopy is an ionization method that produces pseudomolecular ions in the form of $[M]K^+$ with little or no fragmentation. Intact organic molecules are desorbed by rapid heating. In the gas phase the organic molecules are ionized by potassium attachment. Potassium ions are generated from an aluminosilicate matrix that contains $K_2O$. All of these experiments were performed on a Finnegan® model 4615B GC/MS quadrupole mass spectrometer. An electron impact source configuration operating at 200° C. and a source pressure of $<1\times10^{-6}$ torr was used.

All molecular weights are by GPC (gel permeation chromatography) using styrene as an example. The following abbreviations are used in the examples below:
TAPCo=meso-tetra(4-methoxyphenyl)porphyrin-Co
PcCo=tetrakis(tert-butyl)phthalocyanine Co
AIBN=2,2'-azobis(isobutyronitrile)
MMA=methylmethacrylate
BMA=butylmethacrylate
GMA=glycidylmethacrylate
HEMA=2-hydroxyethyl methacrylate
PMMA=poly(methylmethacrylate)
Py=pyridine
dmg=dimethylglyoxime
dpg=diphenylglyoxime
$M_n$=number average molecular weight
$M_w$=weight average molecular weight

EXAMPLE 1

This example illustrates the preparation of a block copolymer according to the present invention (predominantly MMA-MMA-BMA). A solution of 11.2 mg of TAPCo and 32.5 g of AIBN in 14 mL of $CHCl_3$ was divided into two unequal parts. To a 10 mL portion, 2 mL of MMA-dimer and 2 mL of freshly vacuum-distilled BMA was added. A 0.35 mL amount of BMA was added to a 3 mL portion of the solution as a reference experiment. The samples were degassed by three freeze-pump-thaw cycles, sealed and immersed into an isothermal bath at 70° C. After 5 hours, the samples were taken out and chilled until they could be analyzed by K+IDS mass-spectroscopy. The analysis by mass-spectroscopy showed that approximately 80% of the product was MMA-MMA-BMA, with the remaining approximately 20% being starting MMA-dimer, $MMA_2BMA_2$ and low oligomers of BMA.

In another reference sample, made as described above with MMA-dimer and BMA, but without TAPCo, the major product was poly(BMA) with $M_n$=7193 and $M_w$=12,400. Only negligible incorporation of MMA-dimer into BMA product was observed.

EXAMPLE 2

This Example illustrates the conversion of dimer to a higher DP oligomer according to the present invention. A mixture of 8 mg of TAPCo, 0.2 mL of MMA-dimer, 0.05 mL of fleshly-distilled MMA and 4 mg AIBN in 1.3 mL of $CHCl_3$ was degassed and sealed as described in Example 1. The sample was kept 1 hour at 70° C. Then it was chilled and another 0.05 mL of MMA was added followed again by degassing and sealing. The procedure was repeated after 2 and 3 hours. Thus, at the end of the experiment, equal portions of monomer and dimer had been added. Then the sample was kept an additional 2 hours. The content was investigated by HPLC. Most of the product was dimer through hexamer ($M_n$=282, $M_w$=319). Dimer content was well below half of the mass that would have been expected if it had not reacted with monomer.

COMPARATIVE EXAMPLE 2

As a control, a sample was prepared and treated as described in Example 2, except that no oligomer was added. The product was dimer through hexamer with essentially the same distribution of oligomers as in Example 2 ($M_n$=291, $M_w$=336).

COMPARATIVE EXAMPLE 3

As an additional control experiment, the same experiment as described in Comparative Example 2 was carried out without TAPCo. The reaction product showed practically no MMA-dimer incorporation and the resulting Poly(MMA) had $M_n$=5770 and $M_w$=10600.

EXAMPLE 4

This Example illustrates the conversion of trimer to a higher DP oligomer according to the present invention. The sample was prepared and treated as in Example 2, except trimer was used instead of dimer. The product was again dimer through hexamer with a slightly higher number average molecular weight ($M_n$=303, $M_w$=346). Dimer content was well below half of the mass that would have been expected if it had not reacted with monomer.

COMPARATIVE EXAMPLE 5

As an additional control experiment, the same experiment as described in Example 4 was carried out without TAPCo. It showed practically no MMA-trimer incorporation and the resulting Poly(MMA) had an $M_n$=1200 and $M_w$=2000.

EXAMPLE 6

This Example illustrates the preparation of a block copolymer according to the present process, employing another Co chain transfer catalyst. A mixture of 2 mg of PcCo, 0.15 mL of MMA-dimer, 0.05 mL of BMA, 0.35 mL of tetrachloroethane (TCE) and 3 mg of VAZO-88® was degassed and sealed as described in Example 1. The mixture were kept at 110° C. for 30 min. Another 0.05 mL of BMA was added followed by degassing and sealing. The ampoule was kept for additional hour at 110° C. $K^+$IDS analysis showed that 70% of the reaction product consists of $MMA_2BMA_n$ where $1\leq n\leq5$.

EXAMPLE 7

This Example illustrates the preparation of a block copolymer according to the present process, employing yet another Co chain transfer catalyst. The experiment was carried as it is described in the Example 6 but with 2 mg of $(BF_2)_2(dmg)_2Co(2\text{-propyl})H_2O$ instead of PcCo. Analysis showed $MMA_2BMA$ was obtained with 50% yield.

EXAMPLE 8

This Example illustrates the preparation of a block copolymer according to the present process, employing yet another Co chain transfer catalyst. Degassed and sealed as described in the Experiment 1, a mixture of 15 mL of chloroform, 3 mL of MMA-dimer, 32 mg of AIBN, 3 mg of $(dpg)_2Co(Cl)Py$ and 1.8 mL of BMA was kept at 70° C. for two hours. According to KIDS data, $MMA_2BMA$ was obtained with a 67% yield.

EXAMPLE 9

This Example illustrates the preparation of a block copolymer according to the present process, employing a hydroxy-functional monomer. Degassed and sealed as described in the Experiment 1, a mixture of 0.9 mL of chloroform, 0.21 mL of MMA-trimer, 3 mg of AIBN, 2.6 mg of TApCo and 0.03 mL of 2-hydroxyethyl methacrylate (HEMA) was kept at 80° C. for 45 min. Then 0.03 mL of HEMA was added and the mixture was repeatedly degassed, sealed and kept at 80° C. for another 45 min. Then another 0.03 mL portion of HEMA was added and the mixture was degassed and sealed followed by keeping 1.3 hours at 80° C. According to KIDS data, a product, $MMA_n HEMA_m$, composition where n=3 and m=1 or 2 was obtained.

EXAMPLE 10

This Example illustrates the preparation of a block copolymer according to the present process, employing another hydroxy-functional monomer. Degassed and sealed as described in the Experiment 1, a mixture of 0.9 mL of chloroform, 0.2 mL of MMA-dimer, 3 mg of AIBN, 2.6 mg of TAPCo and 0.045 mL of glycidyl methacrylate (GMA) was kept at 80° C. for 45 min. Then 0.045 mL of GMA was added and the mixture was repeatedly degassed, sealed and kept at 80° C. for another 45 min. Then another 0.045 mL portion of GMA was added and the mixture was degassed and sealed followed by keeping 1.3 hours at 80° C. According to KIDS data, the product, $MMA_2 GMA$, was obtained with 78% yield.

What is claimed is:

1. A method for preparing terminally unsaturated oligomers by free radical polymerization, comprising polymerizing monomer in the presence of an effective amount of a free radical initiator and metallic chain transfer catalyst to produce a primary oligomer composition comprising terminally unsaturated oligomers, dividing at least a portion of the primary oligomer composition into a relatively lower DP fraction and a relatively higher DP fraction, and subjecting the relatively lower DP fraction to an effective amount of a metallic chain transfer catalyst for a second time in order to reconvert its terminally unsaturated oligomers to free radicals for further polymerization, thereby increasing their degree of polymerization by at least one.

2. A method for preparing terminally unsaturated oligomers by free radical polymerization comprising polymerizing a first monomer in the presence of an effective amount of a free radical initiator and metallic chain transfer catalyst to produce a first oligomer composition comprising terminally unsaturated oligomers, followed by subjecting at least a portion of said first composition to further polymerization by again subjecting its terminally unsaturated oligomers to an effective amount of said free radical initiator and a metallic chain transfer catalyst, this time in the presence of a second monomer, in order to reconvert said terminally unsaturated oligomers to free radicals for further polymerization with said second monomer to produce a block polymer composition.

3. A method for preparing terminally unsaturated oligomers by free radical polymerization, comprising:

(a) polymerizing in a reaction zone, monomers in the presence of an effective amount of a free radical initiator and metallic chain transfer catalyst to produce a primary oligomer composition comprising terminally unsaturated oligomers;

(b) fractionating, in a separate zone, at least a portion of the primary oligomer composition into a relatively lower DP oligomer fraction and a relatively higher DP oligomer fraction;

(c) subjecting, for a second time, the terminally unsaturated oligomers in said relatively lower DP oligomer fraction to an effective amount of said free radical initiator and metallic chain transfer catalyst in order to reconvert said terminally unsaturated oligomers in said relatively lower DP fraction to free radicals for further polymerization; and (d) withdrawing, as an oligomer product composition, the relatively higher DP oligomer fraction.

4. The method of claim 1, 2, or 3, wherein the metallic chain transfer catalyst is a cobalt (II or III) chelate.

5. The method of claim 1, 2 or 3 wherein 80% or more of said monomer is selected from the group consisting of methacrylate esters, methacrylonitrile, and alpha-methylstyrene.

6. The method of claim 1 or 3 wherein said primary oligomer composition has a degree of polymerization ranging from about 2 to about 12.

7. The method of claim 1, 2, or 3 wherein the relatively higher molecular oligomer fraction or oligomer product composition has a degree of polymerization of 3 to 12.

8. The method as recited in claim 1 or 3 wherein the relatively lower DP oligomer fraction has a degree of polymerization less than or equal to n, wherein n is less than or equal to 5.

9. The method of claim 1 or 3 wherein said fractionating separates dimers from the relatively higher DP fraction.

10. The method of claim 1 or 3 wherein said fractionating separates monomers, dimers, trimers, or mixtures thereof, into the relatively lower DP oligomer fraction.

11. The method of claim 3 wherein the relatively lower DP oligomer fraction is recycled to the reaction zone for further polymerization.

12. The method as recited in claim 1 or 3 wherein said fractionating is by distillation.

13. The product of the process of claim 2.

14. The product of the process of claim 3.

15. A method for preparing terminally unsaturated oligomers by free radical polymerization, comprising:

(a) polymerizing, in a reaction zone, monomer in the presence of an effective amount of a free radical initiator and metallic chain transfer catalyst selected from the group consisting of cobalt (II or III) chelates, thereby producing a primary oligomer composition comprising terminally unsaturated oligomers having an average degree of polymerization ranging from about 2 to about 12, wherein 80% or more of the monomeric units in said terminally unsaturated oligomers are selected from the group consisting of nethacrylic esters, methacrylonitrile, and alpha-methylstyrene;

(b) fractionating, in a separate zone, at least a portion of the primary oligomer from the reaction zone, into a relatively lower DP oligomer fraction and a relatively higher DP oligomer fraction;

(c) recycling said relatively lower DP fraction back to said reaction zone, whereby terminally unsaturated oligomers in said relatively lower DP oligomer fraction are again subjected to an effective amount of said free radical initiator and metallic chain transfer catalyst in order to reconvert said terminally unsaturated oligomers in said relatively lower DP oligomer fraction to free radicals for further polymerization; and (d) removing the relatively higher DP oligomer fraction, from the separation zone, as an oligomer product composition comprising terminally unsaturated oligomers having a degree of polymerization of 3 to 12.

* * * * *